United States Patent [19]

Drexhage et al.

[11] Patent Number: 5,028,105
[45] Date of Patent: Jul. 2, 1991

[54] PHOTOREFRACTIVE EFFECT IN BULK GLASS AND DEVICES MADE THEREFROM

[75] Inventors: Martin G. Drexhage, Fiskdale; Lee M. Cook, Spencer, both of Mass.; Tracey L. Margraf, South Windsor, Conn.; Cornelius T. Moynihan, Watervliet, N.Y.

[73] Assignee: Galileo Electro-Optics Corporation, Sturbridge, Mass.

[21] Appl. No.: 454,646

[22] Filed: Dec. 21, 1989

[51] Int. Cl.$^5$ ................................................ G02B 6/10
[52] U.S. Cl. ................................ 350/96.3; 350/96.12
[58] Field of Search ..................... 350/96.30, 96.12; 430/494

[56] References Cited

U.S. PATENT DOCUMENTS

| | | |
|---|---|---|
| 3,297,388 | 1/1967 | Woodcock et al. |
| 3,689,264 | 9/1972 | Chandross et al. ............... 96/35.1 |
| 3,809,686 | 5/1974 | Chandross et al. |
| 4,644,519 | 2/1987 | Markvoort et al. |

OTHER PUBLICATIONS

Tanaka et al., "Photo-Optical Devices by Amorphous As-S Waveguides", J. Appl. Phys., 57(11), Jun. 1, '85, p. 4897.
Tanaka, "Reversible Photostructural Change: Mechanisms, Properties and Applications", J. Non-Crys Sol., 35 & 36, 1980, p. 1023.
Keneman, "Hologram Storage in Arsenic Trisulfide Thin Films". Appl Phys Let, 19(6), 15 Sep. '71, p. 205
Ihmachi et al., "Laser Induced Refractive-Index Change in As-S-Ga Glasses" A Phys Let., 20(12), 15 Jun. '72, p. 506.
Kapny et al., "Recent Developments in Infrared Fiber Optics", Optics Technology, Inc., Belmont, California (1964).
DeNeufville et al., Photostructural Transformations in Amorphous $As_2Se_3$ and $As_2S_3$ Films, Journal of Non--Crystalline Solids, 13 191-233 (1973).
Kanamori et al., Chalcogenide Glass Fibers for Mid-Infrared Transmission, Journal of Lightwave Technology, vol. LT-2, No. 5 (1984).
Lyubin, Photostructural Changes in Chalcogenide Glasses, Journal of Non-Crystalline Solids, 97 & 98 (1987).
Ohmachi et al., Laser-Induced Refractive-Index Change in As-S-Ge Glasses, Appl. Phys. Lett., vol. 20, No. 12, 15 (1972), p. 506.
Singh et al., Effect of Temperature on Diffraction Efficiency of Holograms Recorded in Arsenic Trisulphide Thin Films, Optica Acta, vol. 31, No. 10 (1984), p. 1161.
Lee et al., Reversible Recording and Erasure of Holograms in Photodarkened $As_2S_3$ Thin Film, Applied Optics, vol. 25, No. 24 (1986).
Brandes et al., Optically Formed Dielectric Gratings in Thick Films of Arsenic Sulfur Glass, J. Opt. Soc. Am 68 32 (1970).
Tanaka, Photo-Induced Dynamical Changes in Refractive Index in Amorphous As-S Films, Solid State Communications, vol. 28, pp. 541-545 (1978).
Tanaka, Transient-Grating Study of Amorphous $As_2S_3$ Films, J. Appl. Phys. 65 (5) (1989).

(List continued on next page.)

*Primary Examiner*—John D. Lee
*Assistant Examiner*—Stephen W. Barns
*Attorney, Agent, or Firm*—Watson, Cole, Grindle & Watson

[57] ABSTRACT

The photorefractive effect results in a change in the refractive index of bulk chalcogenide glass when it is exposed to certain wavelengths of light, in particular, sub-band-gap light. The effect results in a variety of device structures including a fiber optic faceplate; an optical waveguide; a fiber tap; a lens and a Bragg grating. Methods for fabricating the various devices are described.

28 Claims, 6 Drawing Sheets

OTHER PUBLICATIONS

Zembutsu et al., Photosensitive As-S-S-Ge Amorphous Films and Some Applications to Optical Waveguide Device, IOOC (1977) A8-5.

Mizushima et al., Photostructural Change of Amorphous Chalcogenide Films Applied to Lithography, IOOC (1977), 02-3, p. 583.

Nishihara, Direct Writing Technique Using a Scanning Electron Microscope: Fabrication of Optical Gratings in Amorphous Chalcogenide Films, IOOC (1977), 02-4.

McCormick, Generation of Large Spot Arrays from a Single Laser Beam by Multiple Imaging with Binary Phase Gratings, Optical Engineering, vol. 28, No. 4 (1989).

Tanaka, Relations Between Dynamical and Reversible Photoinduced Changes, Journal of Non-Crystalline Solids 35 & 36 (1980).

Tanaka, Composition Dependence of Photo-Induced Refractive Index Changes in Amorphous As-S Films, Thin Solid Films, 37 (1979).

Fleury, Coherence and Energy Transfer in Glasses, pp. 281-309, Plenum Press (1984).

EXPOSE WITH
SUB-BANDGAP LIGHT

PHOTOREFRACTIVE EFFECT IN BULK GLASS AND DEVICES MADE THEREFROM

BACKGROUND OF THE INVENTION

The invention relates to the photorefractive effect in glass. In particular, the invention relates to the application of the photorefractive effect to the fabrication of optical devices based on chalcogenide glasses.

The Fiber Optic Faceplate (FOFP) is an important product, finding applications in various technologies, e.g., night vision devices and CRT displays. FOFPs are manufactured by heating and drawing a core/clad preform into thin canes, bundling the canes, and redrawing them to yield a multifiber bundle. After several such redraws, the thin bundles, each consisting of many individual optical fibers, are heated and fused into a block. The block is cut and polished to yield a thin plate, cylinder, or other configuration which can serve as an image transfer device. In effect, the finished FOFP is a fused array of many thousands of very small optical fibers. The process is time consuming and labor and materials intensive.

The FOFP and other fused fiber devices made by this process are designed to operate at light wavelengths in and around the visible portion of the spectrum, where the glasses used to make them are transparent. In particular, infrared (IR) transparent optical fibers derived from materials known as chalcogenide glasses have emerged as important new materials having a variety of desirable applications.

The term chalcogenide glasses defines a large family of vitreous materials fabricated from metals (e.g., As, Ge, Sb) in conjunction with the heavier elements in the oxygen family (i.e., the calcogens S, Se, Te). There are literally hundreds of such glass-forming chalcogenide compositions; one well studied example is the glass known as arsenic trisulfide or $As_2S_3$. Generally speaking, chalcogenide glasses have low glass transition temperatures (typically 180°–300° C.) and high refractive indices (typically 2.5). While dependent on composition, the transparency range of these glasses spans (roughly) the 0.8 to 15 micron region.

Optical fibers drawn from chalcogenide glasses are known. It is also known to draw and fuse many such fibers into a bundle and use them to transmit simple IR images. There are problems, however, in maintaining the circular cross-section of the individual fiber elements, which tend to distort during the fusing process.

In another approach to making an IR image transmitting device, a thin metal plate containing an array of many small holes (made via lithography and etching) is dipped into a molten chalcogenide glass and then removed. The glass coats the plate and fills the holes. The plate is then polished to remove the surface glass. The result is an IR faceplate in which each glass-filled hole acts a like a fiber element. This technique is difficult to implement and is expensive. Moreover, the faceplate has limited applications.

In many chalcogenide glasses, the refractive index of the material may be increased by illuminating the material with light of an appropriate wavelength and intensity. This light-induced refractive index increase is referred to in the art by a variety of names such as photorefractive effect; photostructural transformation; photodarkening or photoinduced refractive index change (PRC). For simplicity, the designation PRC shall be used in this disclosure to describe the effect. Various PRC effects are summarized below.

It is important to note that the vast majority of PRC related results have been derived from experiments on chalcogenide glass thin films whose thickness is typically 1 to 10 microns. These are often prepared by laborious processes employing thermal evaporation or sputtering from crushed glass or bulk glass targets (discs) in a high vacuum system.

The physical origins of PRC are not well understood and are the subject of ongoing theoretical discussions in the literature. It is generally agreed, however, that the effect occurs in many chalcogenide glasses with the largest effect occurring in vitreous $As_2S_3$ i.e., this glass exhibits the largest increase in index upon irradiation with light. The applications outlined in this disclosure are not limited to a particular chalcogenide composition, but arsenic trisulfide, $As_2S_3$, will be used as an example.

Figure 1:
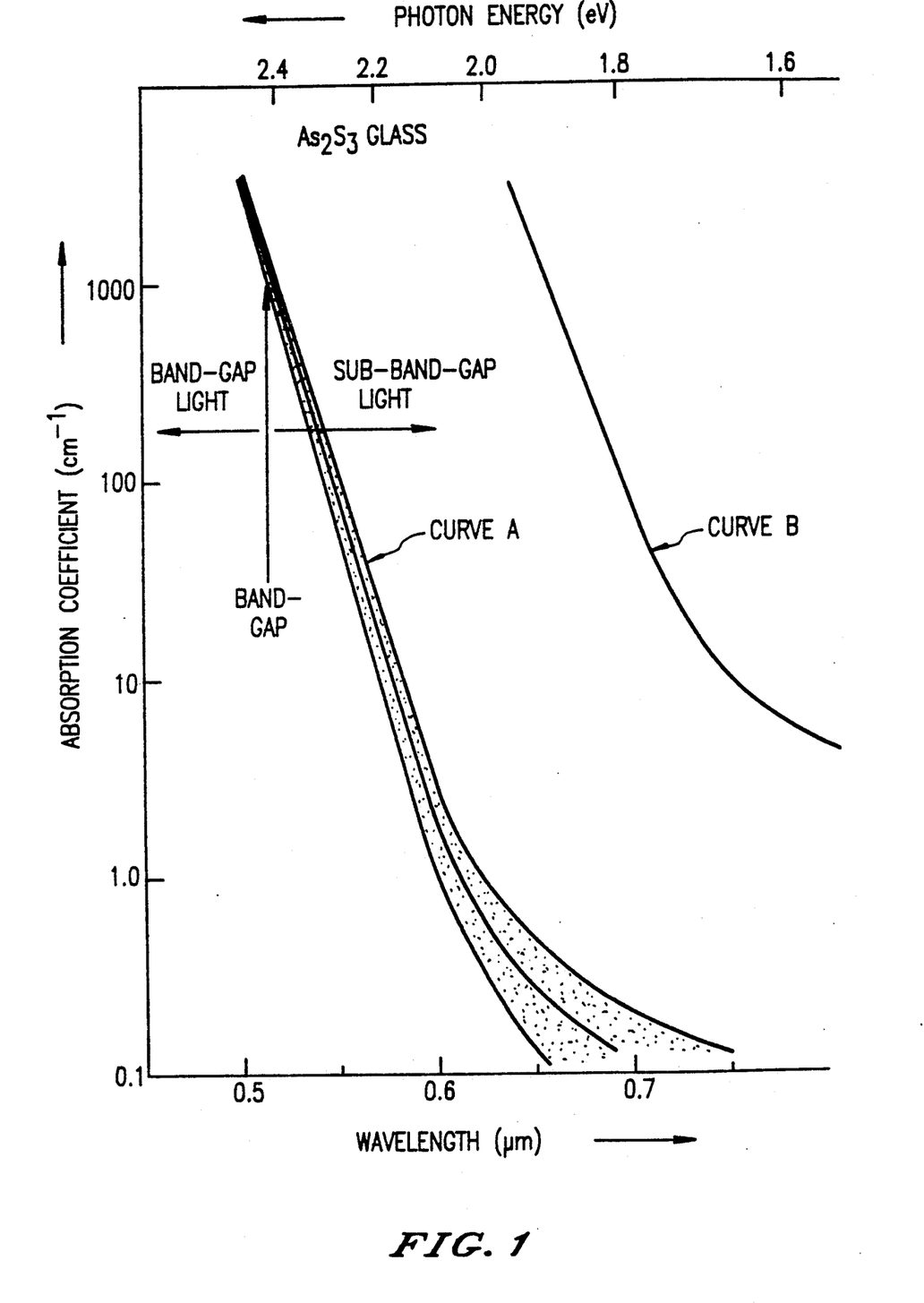
FIG. 1 are logarithmic plots of absorption coefficient ($cm^{-1}$) v. wavelength ($\mu m$) for $As_2S_3$ glass (curve A) and for Ge—Sb—Se glass (curve B)

In FIG. 1 curve A generally shows the estimated average of the absorption coefficient of $As_2S_3$ within a range of values represented by the shaded area about the curve as a function of wavelength (or photon energy) in the visible portion of the spectrum. The data from which curve A was prepared is available from standard references, journal papers and measurements on glasses made by the applicant. There is generally good agreement among these various sources. At high values of the absorption coefficient (e.g., $>1$ cm$^{-1}$) the material is considered opaque. At lower values it is progressively more transparent in the longer wave lengths, $>0.6$ $\mu$m. The arsenic trisulfide thus appears red in color. Over much of the range of FIG. 1, the logarithm of the absorption coefficient is linear with wavelength as is apparent from the curve. Above about 0.6 microns, curve A bends. The origin of this "bend" is still debated, with some authors believing it due to iron impurities in the glass while others suggest that it is intrinsic (inherent) to the glass structure. Curve B is a plot of the measured absortion coefficient for a Ge-Sb-Se glass which is shifted by about 0.1 $\mu$m towards the longer wavelengths.

The band-gap of the glass shown in FIG. 1 is loosely defined as the wavelength region where the absorption coefficient has a value of $10^3$ cm$^{-1}$. The art refers to wavelengths shorter than this as band-gap light. Such wavelengths are almost entirely absorbed before light can progress more than a few microns into the material. Light of wavelengths longer than the band-gap is referred to as sub-band-gap light. Depending on wavelength, such light can penetrate millimeters to centimeters into the material without suffering a significant decrease in intensity.

There are several PRC effects which can occur when a chalcogenide glass is illuminated with light in the wavelength region spanned by FIG. 1. All such PRC effects produce an increase in the refractive index. These effects are referred to in the art by a variety of (partially self-explanatory) names: irreversible PRC; reversible PRC; dynamical PRC and transitory PRC. Which of these effects is operative depends on the wavelength of illumination, the prior thermal history and/or the illumination history of the glass sample.

For clarity, it should be noted that irreversible PRC occurs only in freshly deposited thin films whose structure is much different from that of bulk glasses made by melting and casting. When such fresh films are exposed to band-gap light, their structure photopolymerizes or densifies resulting in a large permanent increase in the refractive index, which cannot be reversed by heating. The same effect can be produced by heating an unexposed freshly deposited thin film. Heating causes densification and an increase in refractive index. Such a heat-treated or annealed film has an index (and other properties) which is considered to be representative of the bulk glass. These annealed films are often used as a starting point for experiments on other PRC effects.

Dynamical and transitory PRC phenomena are less permanent and/or are of smaller magnitude than the thermally reversible effects. They are of interest because they are switchable in one of two ways. In dynamical effects, illumination with one wavelength can increase the index slightly. Illumination with a different wavelength decreases the index to its original value. A transitory effect occurs upon illumination with band-gap light whereby the index increases during illumination but relaxes (decreases) slightly to a lower, but permanent, value when the light is turned off.

In considering the prior art it must be reemphasized that, the application of PRC effects has been limited to very thin chalcogenide glass films or platelets and employs comparatively short wavelengths in the region marked band-gap in FIG. 1. While the term bulk glass is occasionally used in certain references in the art, careful analysis of such references shows the term to have a subtle and often confusing meaning. For example, what appear to be small reversible PRC effects in bulk glasses were obtained when slices from a large ingot (made by conventional melting) were cut and polished to thickness of 10-30 microns for illumination with band-gap region light. Others have looked for reversible PRC in annealed thin films and compared their behavior with that of bulk ingots which were never illuminated. The implicit presumption is that the annealed film properties are representative of bulk glasses behavior. These results conclude that, there is no measurable change ($\Delta n < 0.01$) in the refractive index which accompanies illumination of such annealed films. A further example is contained in work which attempts to compare the reversible PRC behavior of film and so called bulk samples. Unfortunately, no information is available about the preparative conditions or size of the specimens. The work shows that irreversible index changes may occur in bulk samples, but only at cryogenic temperatures. Heating to room temperature eliminates the effect.

Despite the apparent confusion, some practical applications of PRC effects have been reported in the art. One important example is the use of PRC to store holographic images in thin films of chalcogenide glass. Although the glass layers used are only about 10-50 microns thick these have been referred to as volume or 3-dimensional holograms. The films are prepared either by evaporation or by squeezing a molten glass to minimal thickness between two cold plates. In these applications, the glass film serves as photographic medium. The holographic interference pattern is stored in the film as localized increases in the refractive index. The image can be erased or bleached either by heating or by uniformly exposing the plate to light of an appropriate wavelength. The latter has the effect of increasing the index of previously unexposed regions of the plate, such that the stored information, in effect, fades into the background. Such light-induced bleaching is an important concern.

The use of transitory and dynamical PRC effects to fabricate thin film optical signal processing devices has been investigated. These include switches, modulators, and light deflectors in which the propagation of one light beam is controlled by another via local (and temporary) changes in refractive index.

Reversible PRC effects have also been employed to write optical waveguides into evaporated thin glass films. A focused argon laser near 0.514 microns or an electron beam is scanned across the surface of a glass thin film. The beam creates a channel of increased refractive index in the surrounding glass whose width and depth is dependent on the beam spot size and intensity. The channel is thus a waveguide or optical fiber embedded in the film. The technique offers the prospect for fabricating thin film optical integrated circuits containing a variety of devices such as fiber couplers and signal splitters.

Chalcogenide thin films have also found application to the field of optical recording discs. This technology, however, makes use of optically induced (and reversible) crystallization in such glassy films.

Others have described applications for PRC effects in certain bulk plastics in which a cylindrical filament of high refractive index may be optically written deep within the body of a plastic cube by exposing the region to high intensity ultraviolet light. The end use appears to be optical integrated circuits in 3-dimensional bulk form, as opposed to the basically 2-dimensional thin film application outlined above. The concepts have not been extended to multiple filament applications or to glasses.

It would be desirable to have a method which could produce a device consisting of an array of many hundreds or thousands of individual fibers or fiber like structures which could be prepared without use of the draw/redraw/fuse or other mechanical approaches. It would also be desirable that the device operate at wavelengths in the infrared (IR) which is difficult to access with current technology. IR wavelengths of 3-11 microns, are of special interest as many imaging, thermal detection, and analytic systems operate in this region.

SUMMARY OF THE INVENTION

The present invention makes use of the photorefractive effect in bulk chalcogenide glasses. In particular, such glasses exhibit a permanent, but reversible change in the index of refraction deep within the sample by exposure to sub-band-gap light.

The invention can be manifested as a variety of 3-dimensional device structures including fiber optic faceplates, optical fibers, lenses and fiber taps and Bragg gratings. The invention also is manifested in a method of manufacturing an optical fiber.

A unique aspect of the invention is that it extends the use of PRC to bulk chalcogenide glasses, such as objects having a thickness >1 mm and fibers having a diameter >10 microns.

DESCRIPTION OF THE PREFERRED EMBODIMENT

In accordance with the present invention there is provided a method of altering the refractive index of bulk chalcogenide glasses. In particular, the invention permits a greatly simplified manufacture of a variety of devices. In one embodiment the manufacture of a fiber optic faceplate for use in the infrared spectral region is described.

Figure 2A:
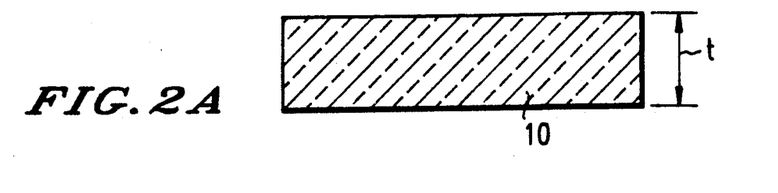
FIGS. 2A-2E illustrate in step wise form the fabrication of a fiber optic faceplate (FOFP) according to one embodiment of the invention.
Figure 2B:
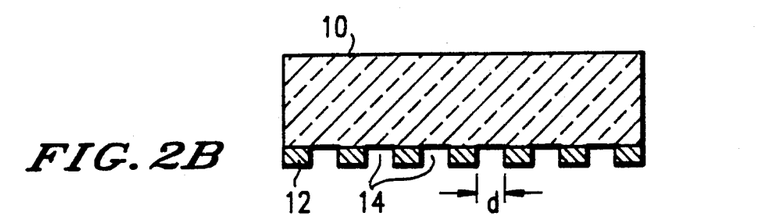
Figure 2C:
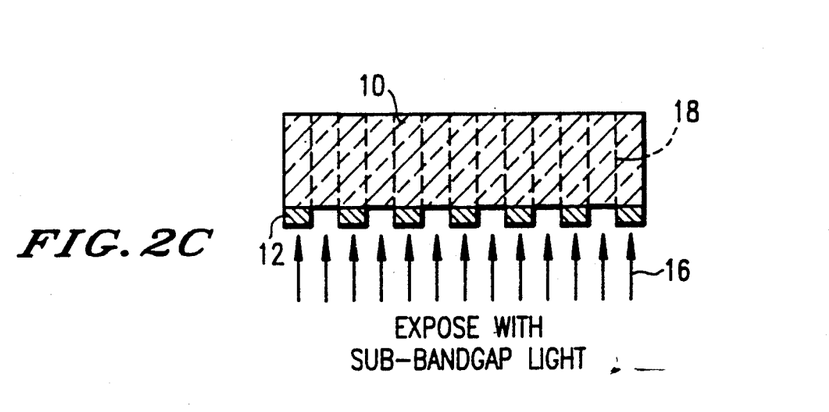
Figure 2D:
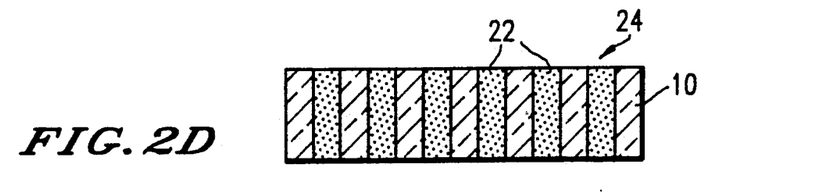

This concept is illustrated in FIGS. 2A-2D. The starting material is a suitably polished plate or disc 10 of well-annealed bulk chalcogenide glass made by known glass melting/preparation methods. The thickness of the disc 10 may be on the order of hundreds of microns to several millimeters. Using known photolithography techniques, an optically opaque mask 12 containing a plurality of holes 14 is applied to one surface (FIG. 2B). The diameter d of the holes 14 is selected based on the desired optical performance of the finished article. For example, the holes 14 may be a few to several 10's of microns in size. The masked plate 10 is then uniformly illuminated with sub-band-gap light 16 (FIG. 2C). The wavelength of the light 16 is chosen on the basis of an absorption curve similar to FIG. 1. Each hole 14 in the mask 12 allows the light 16 to penetrate and illuminate a roughly cylindrical volume of glass 18. PRC effects cause the refractive index of these regions 18 to increase (FIG. 2D). The selected wavelength would be such that there is good penetration into the disc 10. In the case of an $As_2S_3$ plate a few millimeters thick, for example, one would choose a wavelength near the bend of curve A in FIG. 1 (e.g. 0.6–0.65 $\mu$m) so that PRC occurs throughout the sample thickness and not simply in a thin layer near the surface. According to the invention, exposure of the disc 10 with sub-band-gap light 16 is effected for a time sufficient to result in permanent PRC in the cylindrical volumes 18, such that the disc 10 has a plurality of high index filaments 22 optically formed therein (FIG. 2D). The result is a fiber optic faceplate structure 24. The photomask 12 is thereafter removed.

Figure 2E:
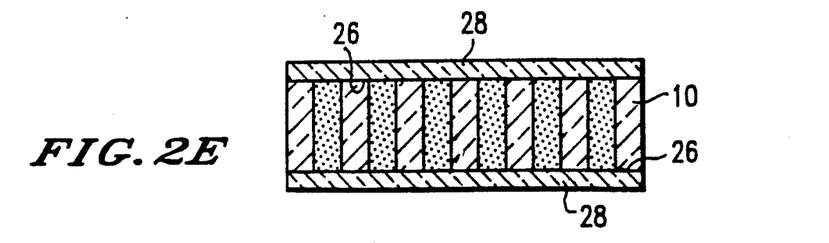

As noted earlier various PRC effects generated in some structures are susceptible to reversal or bleaching and/or relaxation or fading with time. These effects occur because ambient lighting contains wavelengths which can cause PRC effects to occur. Bleaching and fading may be overcome by coating the opposite faces 26 of the faceplate structure 24 with a thin layer or overcoat 28 of a different chalcogenide glass composition (FIG. 2E). For example, if the disc 10 of the faceplate 24 is fabricated from $As_2S_3$, the overcoat 28 may be a Ge—Sb—Se glass. The latter glass has, (like all chalcogenide glasses), has an absorption edge characteristic (curve B) similar to curve A shown in FIG. 1 except that it is shifted to longer wavelengths. For example, at a given wavelength, the absorption coefficient, curve B, of the overcoat 28 is several orders of magnitude higher than the absorption coefficient represented by curve A of the faceplate glass, thus protecting it from short wavelength bleaching radiation. These faceplates are designed to operate in the 4–11 $\mu$m region and both glasses are transparent at these wavelengths. The long wavelengths in this region do not produce any measurable PRC as the energy of their photons is too weak. The finished device 36 employing a disc 10 of $As_2S_3$ glass and overcoat 38 of Ge—Sb—Se glass 28 is shown in FIG. 3A.

Figures 3A, 3B:
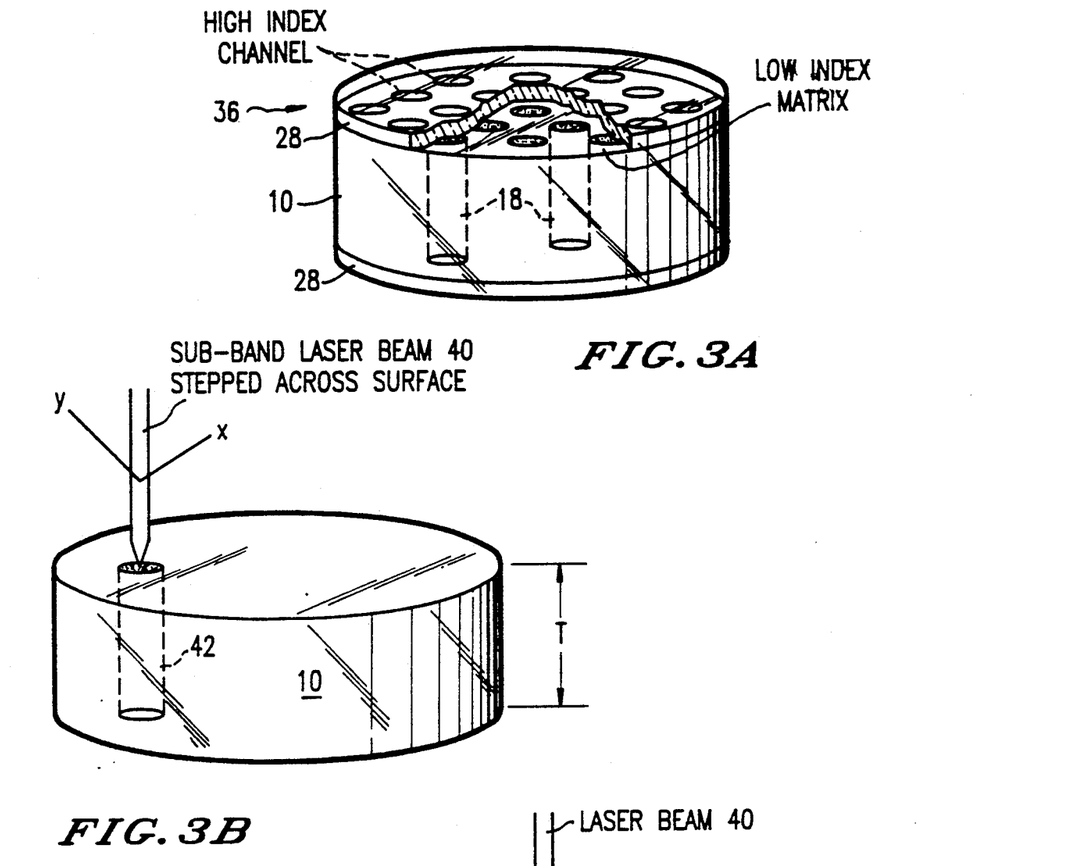
FIG. 3A is a perspective view of a FOFP manufactured in accordance with the method steps illustrated in FIGS. 2A-2E.
FIGS. 3B and 3C illustrate the manufacture of FOFPs according to alternative methods.

In accordance with another embodiment of the invention illustrated in FIG. 3B, the starting material is identical to the disc 10 shown in FIGS. 2A-2D. In this approach, an appropriately focused laser beam 40 is employed to write or burn in high index channels 42 through the thickness T of the disk 10. The beam 40 is stepped across the surface 44 from point to point and turned on and off to create the individual filaments 42. The laser wavelength is selected in accordance with the criteria outlined above. After exposure the overcoat 28 (FIG. 3A) is applied.

Figure 3C:
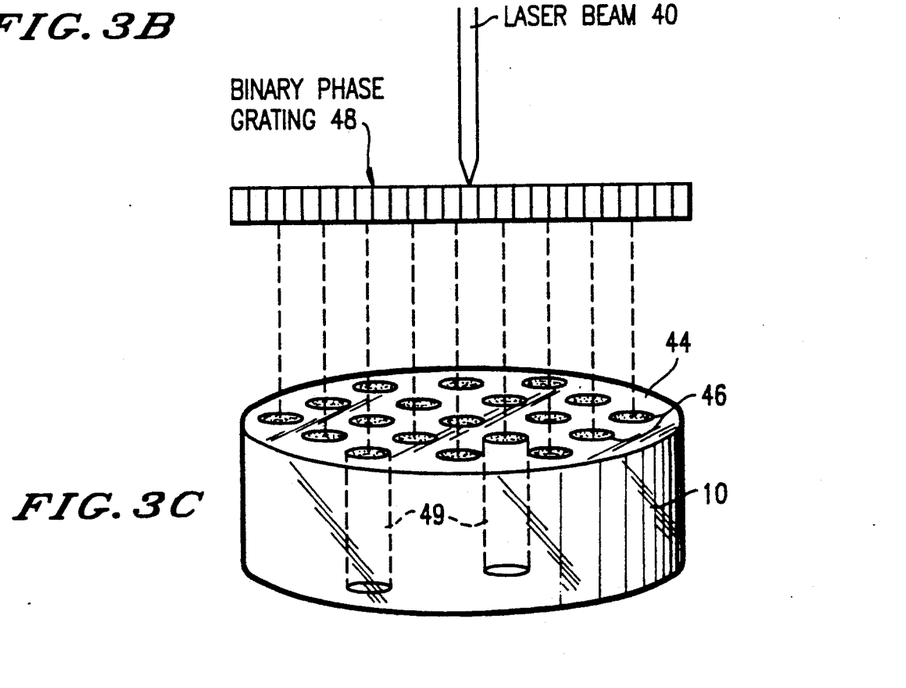

A variant of the above technique is shown in FIG. 3C. A large array (e.g. 100×100) of uniform intensity (small circular) spots 46 is generated by directing a single laser beam 40 through a binary phase grating 48. The array 46 is projected onto the surface 44 of the chalcogenide glass plate 10 to form groups of high index channels 49 simultaneously.

Figure 4:
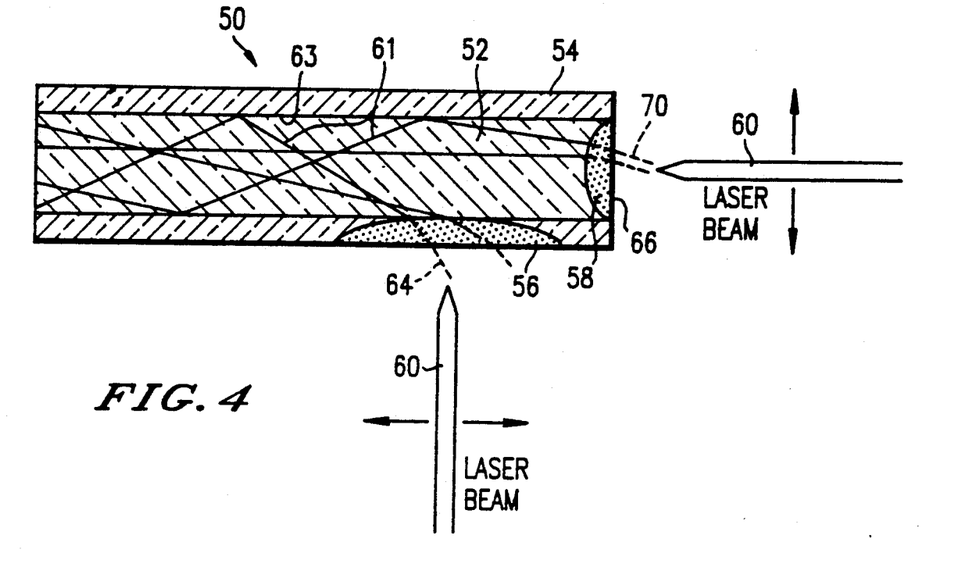
FIGS. 4 and 4A are respective side sectional and end views of an optical fiber in which the index of refraction of the core and cladding have been altered by PRC effects.
Figure 4A:
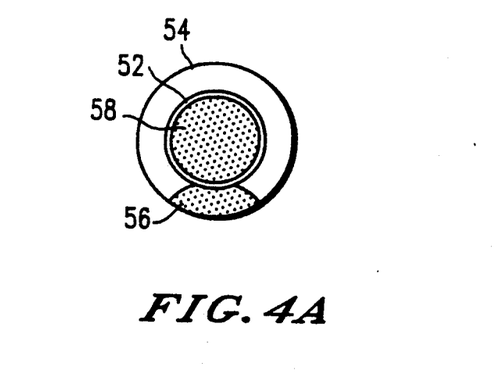

In accordance with the present invention, another application of PRC effects is described in FIGS. 4 and 4A, in which an optical fiber 50 made from chalcogenide glasses is illustrated in respective side sectional and end views. Such fibers are typically 100 to 600 micrometers in diameter (D), and typically consist of a high index core glass 52 surrounded by lower index cladding glass 54. In accordance with the invention the core 52 and cladding 54 may be altered by PRC effects. Higher index regions 56 and 58 represented by the shaded areas may be optically written on such fibers 50 using a finely focused sub-band-gap laser 60. As shown, the core light 62 in unaltered portions of the fiber 50 typically propagates along the core 52 via a series of total internal reflections 61 at the core/clad interface 63. If the index of the cladding 54 is raised in the shaded region 56 via PRC, a fraction 64 of the core light 62 is not totally internally reflected and escapes. The escaping light 64 may be collected by an external device (not shown) and/or coupled to another fiber resulting in a signal splitter (not shown).

Alternatively, the index of the core 52 may be raised locally in the region 58 at the fiber endface 66. The effect is a solid state lens at the fiber end 66. In the altered region 58 the core light 62 becomes focused light 70. The foregoing are two examples of the present invention using PRC to locally modify the index distribution of an already drawn optical fiber to produce optical devices, e.g., a coupler, signal splitter, sensor end tip, etc.

Figures 5, 5A, 5B:
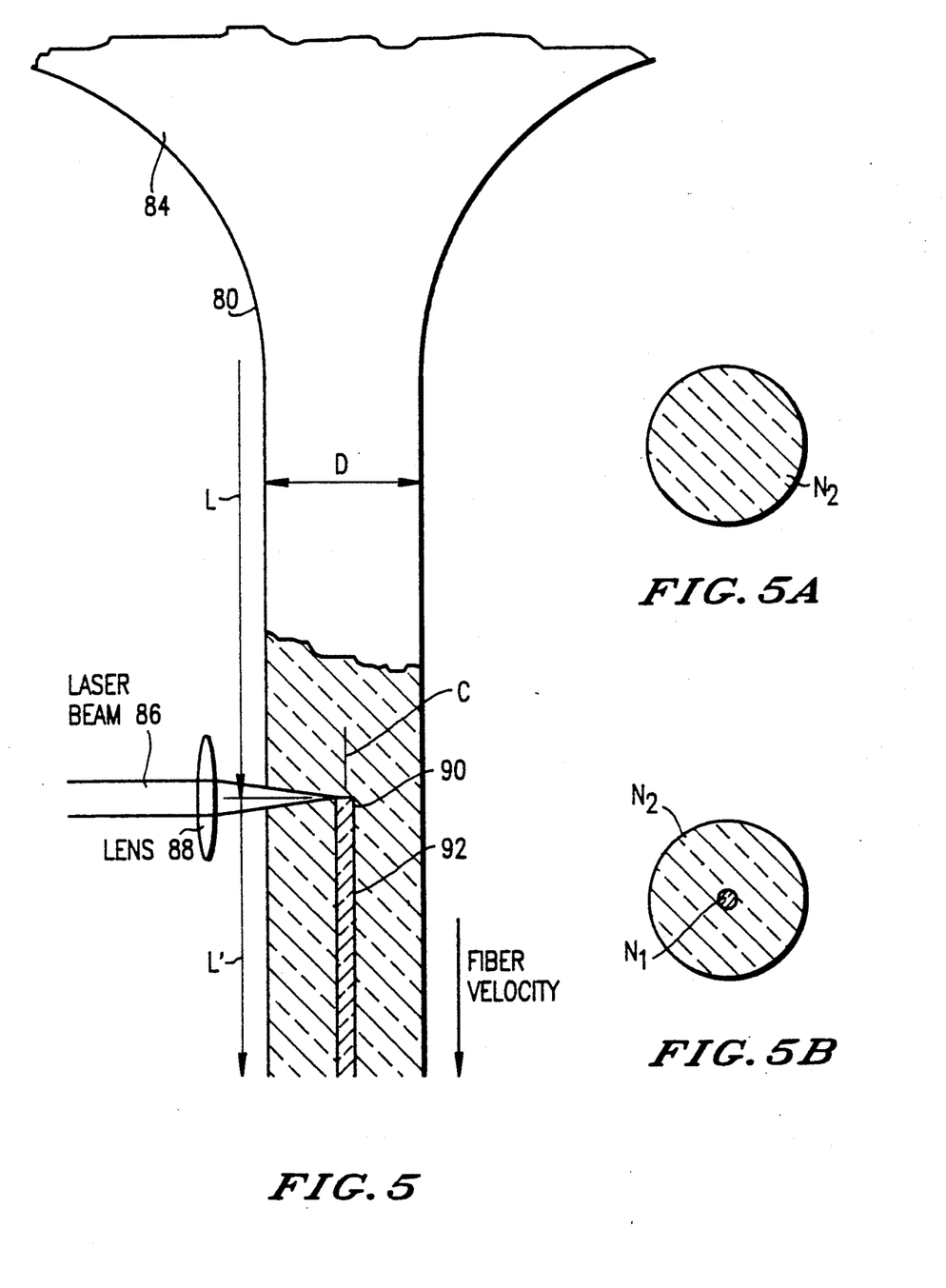
FIGS. 5, 5A and 5B illustrate a method of manufacture of an optical fiber according to the present invention in which the fiber is shown in cross-section before and after application of a laser light source.

In yet another embodiment of the present invention illustrated in FIGS. 5, 5A and 5B, a chalcogenide optical fiber 80 is prepared by drawing glass from the tip 82 of a preform 84 (FIG. 5) (or by pulling directly from molten glass using a crucible technique, not shown). If the preform 84 (or melt) is homogeneous, the fiber 80 is produced having a generally uniform refractive index across its diameter (D) (FIG. 5A), and along its length (L). In accordance with the invention during the drawing process, a beam 86 of sub-band-gap laser light 86 is aimed at the moving fiber 80 through lens 88 (FIG. 5). The sub-band-gap light 86 is focused by the lens 88 at a point 90 within the fiber 80 resulting in a high light intensity near the center (C) of the fiber 80. PRC effects occur within the region 90, and as the fiber 80 moves, a high index region 92 is produced along its length (L') downstream of the location of the applied laser beam 86. In effect, the high index region thus produced is a light guiding core 92 which is written as the fiber 80 is drawn (FIG. 5B).

The concept shown in FIGS. 5, 5A and 5B may be extended by employing a tunable laser (not shown), or one whose intensity varies with time. In this way a spatially varying refractive index profile can be created across the fiber diameter D or along the length L'. Alternatively a second laser beam (not shown), may be applied perpendicular to the beam 86. As will become apparent hereinafter with respect to FIG. 6, optical interference effects occur in the region where two such beams cross, resulting in a Bragg grating. These provide further flexibility in generating unique fiber structures.

EXAMPLE

Figure 6:
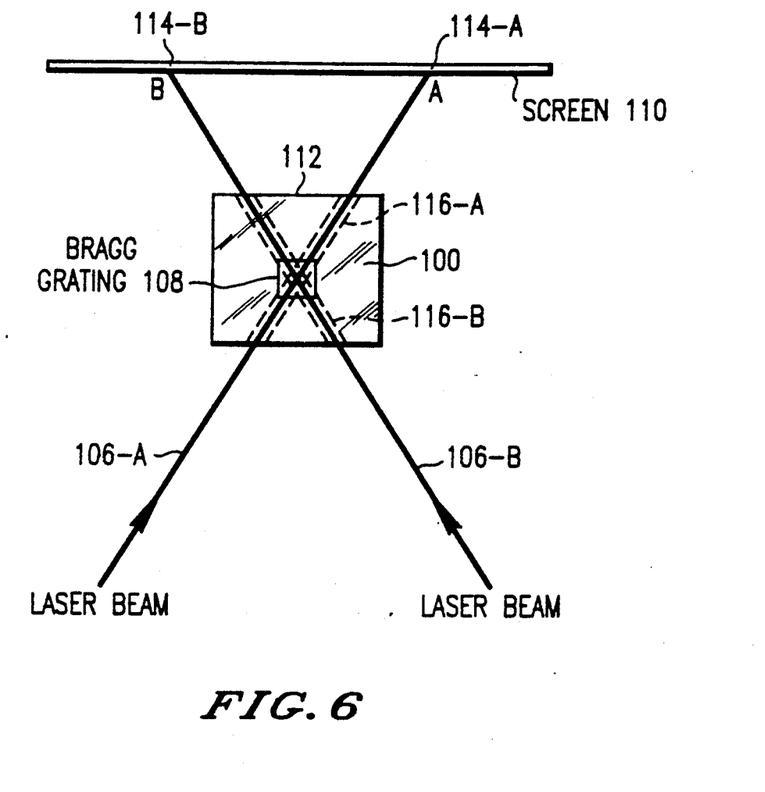
FIG. 6 illustrates a Bragg grating formed in a bulk glass sample in accordance with the present invention.

The optical technique used to test for the existence of PRC in a test piece or disk 100 is schematically illustrated in FIG. 6. An arsenic trisulfide glass melt was prepared, and several 1.5 cm diameter disks 100 with thicknesses of 0.2 to 1.0 cm were cut from the resulting rod and polished. A (red) laser (not shown) having a wavelength of 0.637 microns was selected. Referring to FIG. 1 curve A, the absorption coefficient of the glass disk 100 is about 1 cm$^{-1}$ so that a substantial fraction of the light traverses a specimen near 1 cm thick.

Using a beam splitter (not shown), the light emanating from the laser was divided into two beams 106A and 106B of roughly equal intensities (e.g., a few milliwatts). With the aid of mirrors (not shown), the beams 106A and 106B were directed such that they intersected at a cross-over region 108 about 5 mm inside the 10 mm thick sample 100. The beams 106A and 106B then diverged, i.e. exited the sample 100, and fell on a paper screen 110 some 30 cm from the sample.

Within the cross-over region 108, the light intensity was higher than that of the individual beams 106A, 106B. More importantly, the light waves in the beams 106A, 106B generated an interference pattern in this region; i.e., their amplitudes either add together or cancel one another out. This generated a periodic spatial variation which is a special type of diffraction grating called a "Bragg grating" 112, and it can act as a mirror. In other words, the interference caused by the crossed laser beams 106A, 106B created an equivalent variation in refractive index within the region 108 resulting in the Bragg grating 112. It was postulated that, if the PRC effect is permanent, the Bragg grating 112 should remain imbedded in the sample 100 after the beams 106A, 106B are turned off. Moreover, it should be possible to look for the grating 112 with a probe beam at a later time.

Qualitatively, the following results were observed. For the first few seconds after the beams 106A, 106B were turned on, a pair of sharp dots were observed at points 114A and 114B on the screen 112. Within about 30 sec to 1 min the spots 114A, 114B began to enlarge or bloom. (The PRC effect produced high index waveguide channels 116A, 116B, shown as dotted lines. In the cross-over region 108 the interfering light 106A, 106B produced the Bragg grating 112.) At the low intensities used, the blooming reached equilibrium in about 15-20 minutes, indicating that a steady state value of index was achieved. Confirmation of the effect was observed when one beam (e.g., 106A) was blocked. Whereupon a bright spot appeared near point 114A, with a much dimmer spot near point 114B.

Were there no Bragg grating in the sample 100 (i.e., no permanent index change) the remaining beam 106B would continue to generate only spot 114B on the screen 110. However, due to the PRC-induced Bragg grating 112 the beam 106B was largely reflected within the chalcogenide glass sample 100. Equally important, the sample 100 was removed from its holder (not shown) and replaced at a later time. The grating 112 was readily found by scanning the sample 100 with a probe beam until a strong beam deflection was observed on the screen 110. Using this method, several gratings which are now several weeks old have been examined. The gratings still exist and it appears that they are permanent on this time scale.

The significance of the observation and effects illustrated in FIG. 6 is twofold: first it demonstrates that it is possible to create an apparently long-lived region of increased refractive index via a photorefractive effect deep within a bulk chalcogenide glass using sub-band-gap light; and second it demonstrates that a relatively complex high resolution structure (i.e., a periodic diffraction grating) can be created via PRC.

While the invention has been described in connection with specific embodiments thereof, it will be understood that it is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A method of altering the refractive index in bulk chalcogenide glasses having an absorption coefficient of about $10^3$cm$^{-1}$ at a wavelength defined as the band gap comprising:
   exposing the bulk glass having a thickness greater than about 200μ to sub-band-gap light for a time sufficient to result in an alteration of said refractive index of the glass.

2. A method of claim 1 wherein the bulk glass has an absorption coefficient of 1 cm$^{-1}$ at about 0.6 micrometers.

3. The method of claim 1 wherein the wavelength of the band-gap is about 0.5 micrometers.

4. The method of claim 1 wherein the sub-band-gap light is longer than about 0.5 micrometers.

5. The method of claim 1 wherein the alteration of the refractive index is reversible by application of heat in the vicinity of the glass transition temperature.

6. The method of claim 1 wherein the alteration of the refractive index results in an increase in the index of refraction.

7. The method of claim 1 further including the step of overcoating the altered glass with an overcoat of glass having an absorption coefficient higher the bulk glass.

8. The method of claim 7 wherein the overcoat glass is a chalcogenide.

9. The method of claim 7 wherein the absorption coefficient of the overcoat is at least one order of magnitude higher than that of the bulk glass.

10. The method of claim 9 wherein the bulk glass is susceptible to bleaching by band-gap light and the overcoat is opaque to band-gap light thereby preventing bleaching of the bulk glass.

11. The method of claim 1 wherein the bulk glass is exposed by application of a focused laser beam.

12. The method of claim 1 wherein the light penetrates the bulk glass to a depth of at least one millimeter.

13. The method of claim 1 wherein the exposure occurs by application of at least two focused laser beams crossing at a point within the bulk glass and the resulting alteration is in the form a Bragg grating.

14. The method of claim 1 wherein exposing the bulk glass to sub-band-gap light comprises selectively masking the bulk glass to produce a plurality of parallel fiber-like structures in the bulk glass.

15. The method of claim 14 further comprising coating the exposed bulk glass with an overcoat of glass having an absorption coefficient greater than the bulk glass.

16. The method of claim 1 further comprising drawing a fiber of the bulk glass and exposing a central core portion thereof to the sub-band-gap light for producing an optical fiber.

17. The method of claim 1 wherein the bulk glass comprises an optical fiber having a core and a cladding, and alteration of the glass occurs in the cladding.

18. The method of claim 1 wherein the bulk glass is an optical fiber having a core, a cladding and an end face, and alteration of the glass occurs in the core at the end face thereof for producing a lens.

19. The method of claim 1 wherein the step of exposing the bulk glass to sub-band-gap light comprises projecting the light onto the bulk glass from a binary phase grating.

20. A method of altering the refractive index in bulk chalcogenide glasses having an absorption coefficient of about $10^3 cm^{-1}$ a wavelength defined as the band-gap comprising:

exposing the bulk glass to sub-band-gap light for a time sufficient to result in an alteration of said refractive index of said glass; and overcoating the altered glass with an overcoat of glass having an absorption coefficient higher the bulk glass.

21. The method of claim 20 wherein the overcoat glass is a chalcogenide.

22. The method of claim 20 wherein the absorption coefficient of the overcoat is at least one order of magnitude higher than that of the bulk glass.

23. The method of claim 22 wherein the bulk glass is susceptible to bleaching by band-gap light and the overcoat is opaque to band-gap light thereby preventing bleaching of the altered bulk glass.

24. A method of altering the refractive index in bulk chalcogenide glasses comprising:

exposing the bulk glass to sub-band-gap light for a time sufficient to result in an alteration of said refractive index of said glass; and selectively masking the bulk glass to produce a plurality of parallel fiber-like waveguide structures in such glass.

25. A method of altering the refractive index in bulk chalcogenide glasses comprising:

exposing the bulk glass to sub-band-gap light for a time sufficient to result in an alteration of said refractive index of said glass; and drawing a fiber of the bulk glass and exposing a central portion thereof to the sub-band-gap light for producing an optical fiber.

26. A method of altering the refractive index in bulk chalcogenide glasses having an absorption coefficient of about $10^3 cm^{-1}$ at a wavelength defined as the band gap comprising:

exposing the bulk glass having a thickness greater than thin films to sub-band-gap light for a time sufficient to result in an alteration of said refractive index of the glass.

27. The method of claim 26 wherein the bulk glass has a thickness greater than $100\mu$.

28. The method of claim 26 wherein the bulk glass has a thickness greater than 1 mm.

* * * * *